(12) United States Patent
Krey et al.

(10) Patent No.: US 12,221,209 B2
(45) Date of Patent: Feb. 11, 2025

(54) LEADING EDGE ASSEMBLY, WING, AND AIRCRAFT

(71) Applicant: Airbus Operations GmbH, Hamburg (DE)

(72) Inventors: Dennis Krey, Bremen (DE); Bernhard Schlipf, Bremen (DE); Peter Lücken, Bremen (DE); Florian Lorenz, Bremen (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 28 days.

(21) Appl. No.: 17/615,358

(22) PCT Filed: Aug. 27, 2020

(86) PCT No.: PCT/EP2020/073976
§ 371 (c)(1),
(2) Date: Nov. 30, 2021

(87) PCT Pub. No.: WO2021/037981
PCT Pub. Date: Mar. 4, 2021

(65) Prior Publication Data
US 2022/0227476 A1    Jul. 21, 2022

(30) Foreign Application Priority Data
Aug. 30, 2019  (DE) .......................... 102019123379.8

(51) Int. Cl.
*B64C 3/28*      (2006.01)
*B64C 9/24*      (2006.01)
*B64C 13/34*     (2006.01)

(52) U.S. Cl.
CPC ................. *B64C 3/28* (2013.01); *B64C 9/24* (2013.01); *B64C 13/34* (2013.01)

(58) Field of Classification Search
CPC .................................. B64C 3/28; B64C 13/34
See application file for complete search history.

(56) References Cited

U.S. PATENT DOCUMENTS 3,244,384 A * 4/1966 Bracka ...................... B64C 9/22
                                                          244/210
4,185,542 A * 1/1980 York ....................... B64C 13/36
                                                          92/171.1
(Continued)

FOREIGN PATENT DOCUMENTS

CN    103832579 A  *  6/2014  ............... B64C 9/22
CN    107010200 A  *  8/2017  ............... B64C 3/56
(Continued)

OTHER PUBLICATIONS

International Search Report; priority document.
German Search Report; priority document.

*Primary Examiner* — Magdalena Topolski
*Assistant Examiner* — Anna L. Gordon
(74) *Attorney, Agent, or Firm* — Greer, Burns & Crain, Ltd.

(57) ABSTRACT

A leading edge assembly for an aircraft wing. The leading edge assembly includes a housing configured to be connectable to a fixed wing section of the wing, the housing formed with a first opening connecting an exterior of the housing with an interior of the housing, an actuating element movably connected to the housing, such that the actuating element is movable between a first position and at least one second position. The actuating element extends through the first opening and includes a first section arranged in the interior of the housing and a second section arranged at the exterior of the housing. The actuating element is configured to be connectable to a high lift device.

12 Claims, 10 Drawing Sheets

(56) References Cited

U.S. PATENT DOCUMENTS

| | | | |
|---|---|---|---|
| 4,471,928 A * | 9/1984 | Cole | B64C 9/20 |
| | | | 244/215 |
| 5,927,656 A | 7/1999 | Hinkleman | |
| 6,149,105 A | 11/2000 | Jaggard | |
| 2007/0102587 A1* | 5/2007 | Jones | B64C 9/22 |
| | | | 244/214 |
| 2008/0078879 A1 | 4/2008 | Weaver | |
| 2014/0138481 A1 | 5/2014 | Sakota | |
| 2016/0016653 A1* | 1/2016 | Barger | B64C 13/28 |
| | | | 192/223 |
| 2019/0063605 A1* | 2/2019 | Kracke | F16J 15/004 |
| 2019/0176963 A1* | 6/2019 | Hsueh | B64C 13/34 |
| 2020/0122819 A1 | 4/2020 | Schlipf et al. | |
| 2021/0039771 A1* | 2/2021 | Morisaki | F16H 25/2418 |

FOREIGN PATENT DOCUMENTS

| | | | | |
|---|---|---|---|---|
| GB | 1572004 A * | 7/1980 | | B64C 9/24 |
| GB | 2304656 A | 3/1997 | | |
| GB | 2417937 A | 3/2006 | | |
| WO | 9749607 A1 | 12/1997 | | |
| WO | 2018197649 A1 | 11/2018 | | |

\* cited by examiner

LEADING EDGE ASSEMBLY, WING, AND AIRCRAFT

CROSS-REFERENCES TO RELATED APPLICATIONS

This application claims the benefit of the International Application No. PCT/EP2020/073976, filed on Aug. 27, 2020, and of the German patent application No. 102019123379.8 filed on Aug. 30, 2019, the entire disclosures of which are incorporated herein by way of reference.

FIELD OF THE INVENTION

The invention relates to a leading edge assembly, a wing, and an aircraft.

BACKGROUND OF THE INVENTION

Leading edge assemblies are known and can form an integrated part of a wing of an aircraft. For example, leading edge assemblies can comprise high lift devices to increase the amount of lift the wing can provide during flight of the aircraft. Usually, leading edge assemblies comprise multiple elements which are mounted one after the other to a fixed wing section of the wing.

It is generally desirable to reduce the assembly time of wings and aircraft. Further, it is desirable to reduce contamination of elements of the leading edge assemblies prior, during, and after assembly.

SUMMARY OF THE INVENTION

An object of the invention is to reduce the assembly time of wings and aircraft and to reduce contamination of elements of the leading edge assemblies prior, during, and after assembly.

According to a first aspect of the invention, the object is solved by a leading edge assembly configured for a wing. The leading edge assembly comprises a housing which is configured to be connectable to a fixed wing section of the wing and in which a first opening connecting an exterior of the housing with an interior of the housing is formed. The leading edge assembly comprises an actuating element which is movably connected to the housing such that the actuating element is movable between a first position and at least one second position. The actuating element extends through the first opening. The actuating element comprises a first section which is arranged in the interior of the housing. The actuating element comprises a second section which is arranged in the exterior of the housing and which is configured to be connectable to a high lift device.

The leading edge assembly is configured for the wing. The leading edge assembly is mountable to a remaining section of the wing to form the wing. The leading edge assembly comprises the housing. The housing may comprise a wall with an inner surface facing the interior of the housing and an outer surface facing the exterior of the housing. The housing, in particular the wall of the housing, can separate the interior of the housing and the exterior of the housing and can thereby prevent contamination of the interior and elements arranged in the interior of the housing. The housing is configured to be connectable to the fixed wing section of the wing. When the housing is connected to the fixed wing section of the wing, the housing and the fixed wing section form together at least a section of the wing. The housing is connectable to the fixed wing section of the wing and elements, such as the actuating element, the seal, the drive mechanism, and a roller bearing of the leading edge assembly, can be preassembled by connecting the element or the elements to the housing before the housing is connected to the fixed wing section. Due to the preassembling, the leading edge assembly can be connected to the fixed wing section as a preassembled module and the individual elements do not need to be connected to the fixed wing section one after the other, which may reduce the assembly time during which the wing and the aircraft can be assembled. This is particularly the case if multiple leading edge assemblies are mounted to the wing.

The first opening is formed in the housing and connects the exterior of the housing with the interior of the housing. Since the opening connects the exterior of the housing and the interior of the housing, the opening allows that an element can be arranged, for example the actuating element, such that the element extends through the opening and thereby connecting an element arranged in the interior of the housing, such as at least a section of a drive mechanism or a roller bearing, and an element arranged in the exterior of the fairing, such as the high lift device.

The interior of the housing can be regarded as the space which is surrounded by the housing and in which elements can be arranged, such as at least a section of a drive mechanism and the first section of the actuating element. The interior of the housing may be thought of as the space which is enclosed by the housing. The interior of the housing can be regarded as being defined by the housing. If an element is arranged in the interior of the housing, the element may be regarded as being enclosed by the housing. Further, the exterior of the housing can be regarded as the space which is not surrounded by the housing and in which elements can be arranged, such as the high lift device and the second section of the actuating element. The exterior of the housing may be thought of as the space which is not enclosed by the housing. For example, a fuselage of the aircraft is arranged in the exterior of the housing when the leading edge assembly forms a section of a wing which is mounted to a remaining section of the aircraft to form the aircraft. If an element is arranged in the exterior of the housing, the element may be regarded as being not enclosed by the housing or as being arranged outside of the housing.

The leading edge assembly comprises the actuating element which is movably connected to the housing, such that the actuating element is movable between the first position and the at least one second position. Preferably, the actuating element is movable from the first position to the at least one second position and from the at least one second position to the first position. The actuating element extends through the first opening. The first opening is formed such that the actuating element can extend through the first opening in the first position, in the at least one second position, and when the actuating element is moved between the first position and the at least one second position.

The actuating element comprises the first section which is arranged in the interior of the housing. Preferably, the first section is arranged in the interior of the housing when the actuating element is in the first position and the first section is arranged in the interior of the housing when the actuating element is in the at least one second position. In this case, the first section is preferably arranged in the interior of the housing at any time during movement of the actuating element between the first position and the at least one second position. Alternatively, the first section may be arranged in the exterior of the housing when the actuating element is in the first position and the first section may be arranged in the interior of the housing when the actuating element is in the at least one second position. This is particularly the case when a second opening is formed in the housing. The first section of the actuating element may be drivingly coupled to a drive mechanism of the leading edge assembly.

The actuating element comprises the second section which is arranged in the exterior of the housing, such that the second section of the actuating element may be mounted to an element arranged in the exterior of the housing such as the high lift device. The second section is configured to be connectable to the high lift device. When the high lift device is connected to the second section of the actuating element, the actuating element can drive movement of the high lift device.

In summary, the leading edge assembly helps to reduce the assembly time during which wings and aircraft can be assembled and helps to reduce contamination of elements of the leading edge assemblies prior, during, and after assembly.

According to a preferred embodiment of the leading edge assembly, the leading edge assembly comprises a seal with a first section connected to the housing and a second section abutting the actuating element when the actuating element is moved between the first position and the at least one second position such that the exterior of the housing and the interior of the housing are separated from each other by the seal. Since the seal separates the interior of the housing and the exterior of the housing, the seal may further prevent contamination of the interior and elements arranged in the interior of the housing. Further, since the second section of the seal abuts the actuating element when the actuating element is moved between the first position and the at least one second position, the seal can separate the interior of the housing and the exterior of the housing during movement of the actuating element between the first position and the at least one second position. The seal separates the interior of the housing and the exterior of the housing, which does particularly not exclude that the interior of the housing and the exterior of the housing are also separated at least by the wall of the housing and the actuating element. Particularly, the seal, the wall of the housing, and the actuating element separate the interior of the housing from the exterior of the housing. Especially the seal reduces contamination of elements of the leading edge assembly arranged in the housing prior, during, and after assembly.

According to a preferred embodiment of the leading edge assembly, the leading edge assembly comprises the high lift device which is mounted to the second section of the actuating element, wherein when the actuating element is in the first position the high lift device is in a retracted position and when the actuating element is in the at least one second position the high lift device is in at least one extended position. It is particularly preferred that the actuating element drives movement of the high lift device. Preferably, when the actuating element is moved between the first position and the at least one second position, the actuating element drives movement of the high lift device such that the high lift device is moved between the retracted position and the at least one extended position. The retracted position of the high lift device may correspond to a configuration of the wing when the aircraft is on ground or in normal flight. Preferably, the retracted position of the high lift device is the position of the high lift device in which the high lift device is arranged closest to the wing tip section. Further, a first extended position of the at least one extended position of the high lift device may correspond to a take-off configuration of the wing. In addition, a second extended position of the at least one extended position of the high lift device may correspond to a landing configuration of the wing. Preferably, the second extended position of the high lift device is the position of the high lift device in which the high lift device is arranged furthest away from the wing tip section. It is further preferred that in the first extended position of the high lift device the high lift device is arranged between the retracted position and the second extended position of the high lift device. Preferably, the high lift device is movable from the retracted position to the first extended position and from the first extended position to the retracted position. Further, the high lift device is preferably movable from the retracted position to the second extended position and from the second extended position to the retracted position.

According to a preferred embodiment of the leading edge assembly, the high lift device is a slat. In case the high lift device is a slat, a particularly preferred embodiment is provided.

According to a preferred embodiment of the leading edge assembly, the high lift device is a droop nose. In case the high lift device is a droop nose, a particularly preferred embodiment is provided.

According to a preferred embodiment of the leading edge assembly, the high lift device is a Krueger flap. In case the high lift device is a Krueger flap, a particularly preferred embodiment is provided.

According to a preferred embodiment of the leading edge assembly, the leading edge assembly comprises a drive mechanism which is configured to drive movement of the actuating element. Preferably, the drive mechanism is configured to drive movement of the actuating element which in turn drives movement of the high lift device. Especially, the drive mechanism is configured to drive movement of the high lift device between the retracted position and the at least one extended position, i.e., from the retracted position to the at least one extended position and from the at least one extended position to the retracted position via the actuating element. The drive mechanism may be powered electrically and/or hydraulically and/or pneumatically. The drive mechanism may comprise an actuator, which may be a rotary actuator or a linear actuator, or a pinion drive.

According to a preferred embodiment of the leading edge assembly, the drive mechanism is arranged in the interior of the housing. When the drive mechanism is arranged in the interior of the housing, the drive mechanism can be mounted to the fixed wing section together with the remaining section of the leading edge assembly. Thereby, the assembly time can be significantly reduced, since only one assembly step is needed to mount the leading edge assembly to the fixed wing section.

According to a preferred embodiment of the leading edge assembly, the drive mechanism comprises a rack and a pinion, wherein the rack is mounted to the actuating element and the pinion is rotatably mounted to the housing, wherein the rack and the pinion meshingly engage with each other such that rotation of the pinion drives movement of the rack. When the drive mechanism comprises a rack and a pinion, the rack is mounted to the actuating element, the pinion is rotatably mounted to the housing, the rack and the pinion meshingly engage with each other such that rotation of the pinion drives movement of the rack, a simple a lightweight drive mechanism is provided.

According to a preferred embodiment of the leading edge assembly, the leading edge assembly comprises a roller bearing, wherein the first section of the actuating element is mounted to the housing via the roller bearing. Preferably, the first section of the actuating element and a middle section of the actuating element are mounted to the housing via the roller bearing. A roller bearing provides a smooth movement of the actuating element between the first position and the at least one second position.

According to a preferred embodiment of the leading edge assembly, the roller bearing comprises a guide rail mounted to the housing and a first roller which is rotatably mounted to the first section of the actuating element, wherein the first roller engages a first engagement surface formed by the guide rail such that the first roller rolls on the first engagement surface when the actuating element is moved between the first position and the at least one second position. The first engagement surface provides a running surface for the first roller to roll on when the actuating element is moved between the first position and the at least one second position. The first engagement surface may be formed by an upper surface of the guide rail and/or by a lower surface of the guide rail. Preferably, the first engagement surface is formed by either the upper surface of the guide rail or by the lower surface of the guide rail or by both, the upper surface of the guide rail and the lower surface of the guide rail in a successive manner. The upper surface of the guide rail and the lower surface of the guide rail may face each other. It is preferred that a distance between the upper surface of the guide rail and the lower surface of the guide rail is larger than a diameter of the first roller, such that the first roller may engage only either the upper surface of the guide rail or the lower surface of the guide rail at the same time. The distance between the upper surface of the guide rail and the lower surface of the guide rail may be selected such that a clearance is provided between the first roller and either the upper surface of the guide rail or the lower surface of the guide rail, such that the first roller cannot engage with the upper surface of the guide rail and the lower surface of the guide rail at the same time and thereby block rotation of the first roller. It is further preferred that the first roller has a first axis of rotation extending in parallel to a wing span direction, to a leading edge of the fixed wing section, and/or to a leading edge of the high lift device.

According to a preferred embodiment of the leading edge assembly, the roller bearing comprises a second roller which is rotatably mounted to the housing, wherein the second roller engages a second engagement surface formed by the second section of the actuating element and by the middle section of the actuating element such that the second roller rolls on the second engagement surface when the actuating element is moved between the first position and the at least one second position. The second engagement surface provides a running surface for the second roller to roll on when the actuating element is moved between the first position and the at least one second position.

According to a preferred embodiment of the leading edge assembly, the actuating element comprises a lower flange section, an upper flange section, and a web section connecting the upper flange section and the lower flange section, wherein the second roller is arranged in a recess between the lower flange section and the upper flange section, wherein the lower flange section, the upper flange section, the web section, and the recess each extend along a longitudinal axis of the actuating element, wherein the second engagement surface is formed by the upper flange section and/or the lower flange section. The lower flange section, the upper flange section, and the web section may form a profile of a cross sectional area arranged perpendicular to the longitudinal axis of the actuating element. The profile may be a C-profile, a double-C-profile, an I-profile, an H-profile, or a H-profile.

Preferably, the second engagement surface is formed by either the upper flange section or the lower flange section or both flange sections in a successive manner Preferably, the second engagement surface faces the recess. The second engagement surface may be formed by an upper surface of the upper flange section and/or by a lower surface of the lower flange section. Preferably, the second engagement surface is formed by either the upper surface of the upper flange section or by the lower surface of the lower flange section or by both, the upper surface of the upper flange section and the lower surface of the lower flange section in a successive manner. The upper surface of the upper flange section and the lower surface of the lower flange section may face each other. It is preferred that a distance between the upper surface of the upper flange section and the lower surface of the lower flange section is larger than a diameter of the second roller, such that the second roller may engage only either the upper surface of the upper flange section or the lower surface of the lower flange section at the same time. The distance between the upper surface of the upper flange section and the lower surface of the lower flange section may be selected such that a clearance is provided between the second roller and either the upper surface of the upper flange section or the lower surface of the lower flange section, such that the second roller cannot engage with the upper surface of the upper flange section and the lower surface of the lower flange section at the same time and thereby block rotation of the second roller. It is further preferred that the second roller has a second axis of rotation extending in parallel to the wing span direction, to the leading edge of the fixed wing section, and/or to the leading edge of the high lift device. Since the second roller is arranged in the recess, the second roller does not occupy the space above or below the actuating element, and the actuating element can be held with only a single roller element. This simplifies the leading edge assembly, saves space and weight, and thus increases efficiency of the wing. Further, the leading edge assembly can be formed such that it is arranged entirely in front of the front spar of the fixed wing section and does not penetrate a front spar of a fixed wing section.

According to a preferred embodiment of the leading edge assembly, a second opening connecting the exterior of the housing with the interior of the housing is formed in the housing through which the actuating element extends when the actuating element is in the first position and which is arranged opposite the first opening. Due to the second opening, the leading edge assembly can be designed in a space saving way, since the housing can be designed smaller, since the housing does not have to enclose the first section of the actuating element at any time during movement of the actuating element between the first position and the at least one second position.

According to a second aspect of the present invention, the object is also solved by a wing configured for an aircraft. The wing comprises a leading edge assembly according to an embodiment of the first aspect of the present invention. The housing of the leading edge assembly is mounted to the fixed wing section of the wing. The features, technical effects and/or advantages described in connection with the first aspect of the present invention also apply to the second aspect of the present invention at least in an analogous manner, so that no corresponding repetition is made here.

According to a preferred embodiment of the wing, the housing of the leading edge assembly is mounted to a wing box of the fixed wing section of the wing. When the housing of the leading edge assembly is mounted to the wing box of the fixed wing section of the wing, a direct mechanical coupling between the leading edge assembly and the wing box can be provided.

According to a preferred embodiment of the wing, the housing of the leading edge assembly is mounted to a rib of the fixed wing section, wherein the rib is mounted to the wing box. When the housing of the leading edge assembly is mounted to the rib of the fixed wing section and the rib is mounted to the wing box, an indirect mechanical coupling between the leading edge assembly and the wing box can be provided. Preferably, the leading edge assembly and the rib are preassembled by connecting the leading edge assembly and the rib prior to mounting the rib to the wing box, which saves further assembly time during assembly of the wing and the aircraft. Further, it is preferred that the housing of the leading edge assembly is mounted to a first rib of the fixed wing section and to a second rib of the fixed wing section. The first rib and the second rib can both be mounted to the wing box. Further, the first rib may be arranged on a first side of the housing and the second rib may be arranged on a second side of the housing opposite the first side.

Further, it is preferred that the wing comprises several leading edge assemblies, which are arranged spaced apart in a wingspan direction of the wing from each other. It is preferred that the distances between neighboring leading edge assemblies are the same in the wingspan direction. Especially, when the wing comprises several leading edge assemblies, all leading edge assemblies may be configured the same as described in one of the embodiments or may be configured differently, i.e., as described in different embodiments.

According to a third aspect of the present invention, the object is also solved by an aircraft comprising a wing according to an embodiment of the second aspect of the present invention. The features, technical effects and/or advantages described in connection with the first aspect and the second aspect of the present invention also apply to the third aspect of the present invention at least in an analogous manner, so that no corresponding repetition is made here.

BRIEF DESCRIPTION OF THE DRAWINGS

Further features, advantages and application possibilities of the present invention may be derived from the following description of exemplary embodiments and/or the figures. Thereby, all described and/or visually depicted features for themselves and/or in any combination may form an advantageous subject matter and/or features of the present invention independent of their combination in the individual claims or their dependencies. Furthermore, in the figures, same reference signs may indicate same or similar objects.

DETAILED DESCRIPTION OF THE PREFERRED EMBODIMENTS

Figure 1:
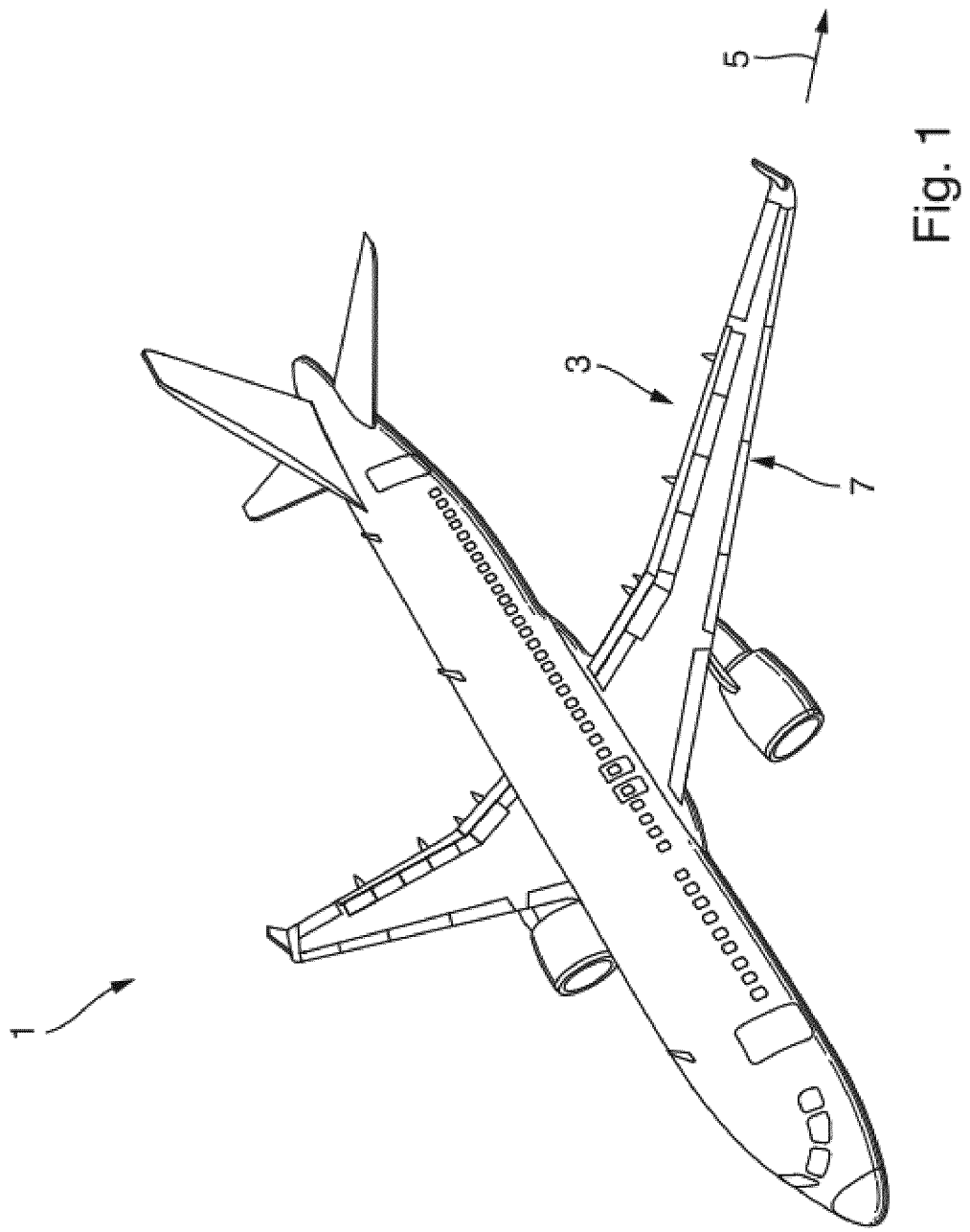
FIG. 1 schematically illustrates in a perspective view an embodiment of an aircraft comprising a wing with a leading edge assembly.

FIG. 1 schematically illustrates in a perspective view an embodiment of an aircraft 1 comprising a wing 3 which extends in a wingspan direction 5. The wing 3 comprises several high lift devices, such as a slat 7. Other high lift devices of the wing 3 are for example 1 a droop nose and a Krueger flap.

Figure 2:
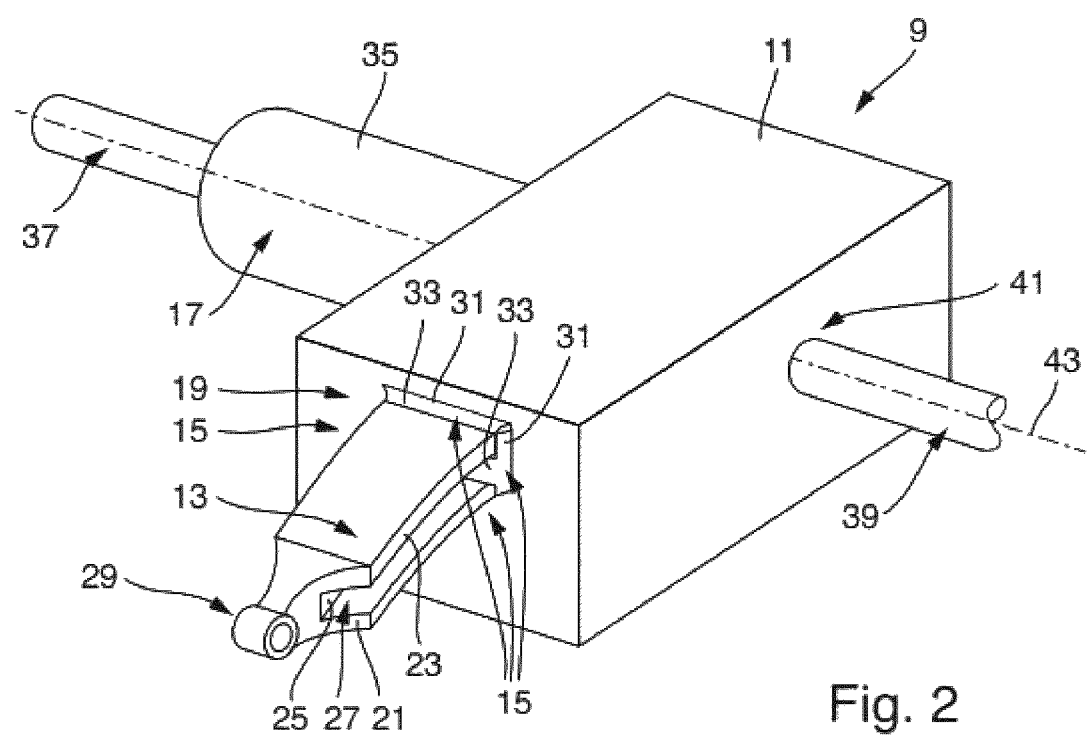
FIG. 2 schematically illustrates in a perspective view a first embodiment of the leading edge assembly of the wing shown in FIG. 1.

FIG. 2 schematically illustrates in a perspective view a first embodiment of the leading edge assembly 9 of the wing 3 shown in FIG. 1. The leading edge assembly 9 comprises a housing 11, an actuating element 13, four seals 15, and a drive mechanism 17.

A first opening 19 is formed in the housing 11. The actuating element 13 extends through the first opening 19. Further, the actuating element 13 comprises a lower flange section 21, an upper flange section 23, and a web section 25. The web section 25 connects the upper flange section 23 and the lower flange section 21. A recess 27 is formed between the lower flange section 21 and the upper flange section 23. Further, the actuating element 13 comprises a lug 29 for connecting a high lift device to the actuating element 13.

Two seals 15 of the four seals 15 are shown in FIG. 2. Two further seals 15 of the four seals 15 are arranged below the actuating element 13 and behind the actuating element 13, respectively. Each seal 15 comprises a first section 31 and a second section 33. Each first section 31 is connected to the housing 11 and each second section 33 abuts the actuating element 13.

The drive mechanism 17 comprises a geared rotary actuator 35, a first shaft 37, and a second shaft 39. The first shaft 37 and the second shaft 39 are connected to the geared rotary actuator 35. The second shaft 39 extends through an opening which is formed in the housing 11. An annular seal 41 comprises a first section and a second section. The first section of the annular seal 41 is connected to the housing 11 and the second section of the annular seal 41 abuts the second shaft 39 when the second shaft 39 rotates about a rotation axis 43.

The actuating element 13 is movably connected to the housing 11 such that the actuating element 13 is movable between a first position and at least one second position. The drive mechanism 17 is configured to drive movement of the actuating element 13 such that the actuating element 13 is moved between the first position and the at least one second position. The second section 33 of each seal 15 abuts the actuating element 13 when the actuating element 13 is moved between the first position and the at least one second position.

Figure 3:
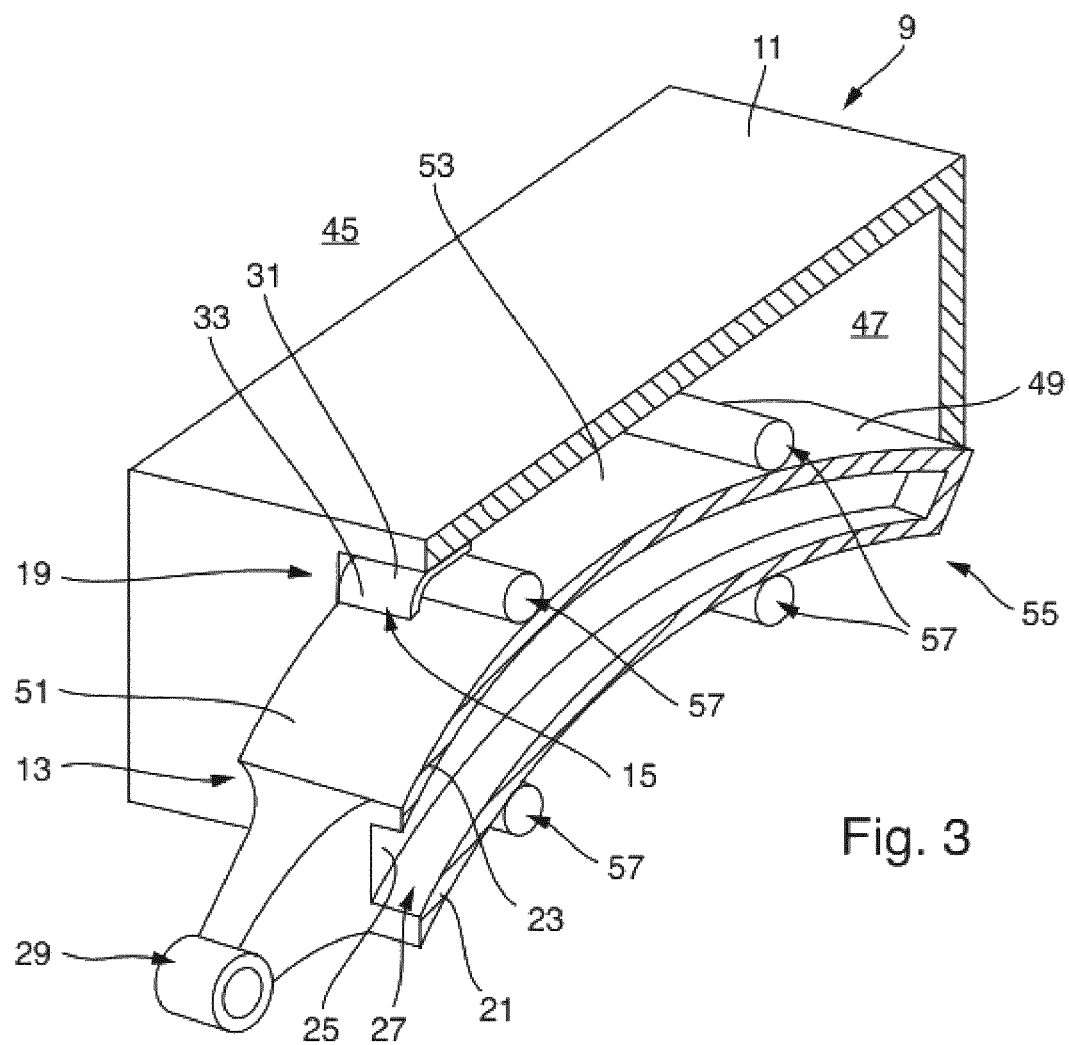
FIG. 3 schematically illustrates in a perspective sectional view the first embodiment of the leading edge assembly shown in FIG. 2.

FIG. 3 schematically illustrates in a perspective sectional view the first embodiment of the leading edge assembly 9 shown in FIG. 2. As can be seen in FIG. 3, the first opening 19 connects an exterior 45 of the housing 11 with an interior 47 of the housing 11. The actuating element 13 comprises a first section 49, a second section 51, and a middle section 53 connecting the first section 49 and the second section 51. The first section 49 is arranged in the interior 47 of the housing 11 and the second section 51 is arranged in the exterior 45 of the housing 11. The middle section 53 can be arranged in the interior 47 of the housing 11 or in the exterior 45 of the housing 11, depending on whether the actuating element 13 is in the first position or in the at least one second position. The second section 51 comprises the lug 29 to be connected to the high lift device. The second section 33 of each seal 15 abuts the actuating element 13 when the actuating element 13 is moved between the first position and the at least one second position such that the exterior 45 of the housing 11 and the interior 47 of the housing 11 are separated from each other by the seal 15. The leading edge assembly 9 comprises a roller bearing 55, wherein the first section 49 of the actuating element 13 and the middle section 53 of the actuating element 13 are mounted to the housing 11 via the roller bearing 55. The roller bearing 55 comprises four rollers 57. Each roller 57 of the rollers 57 are rotatably mounted to the housing 11 such that each roller 57 rolls along an outer surface of the actuating element 13 when the actuating element 13 is moved between the first position and the at least one second position. In particular, each of the rollers 57 engages an engagement surface formed by the first section 49 of the actuating element 13 and formed by the middle section 53 of the actuating element 13 such that each roller 57 rolls on the engagement surface when the actuating element 13 is moved between the first position and the at least one second position.

Figure 4:
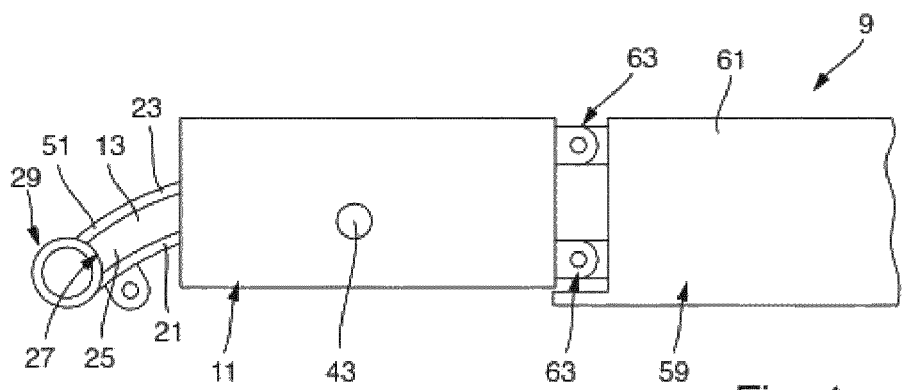
FIG. 4 schematically illustrates in a side view the first embodiment of the leading edge assembly shown in FIG. 2 which is connected to a fixed wing section of the wing shown in FIG. 1.

FIG. 4 schematically illustrates in a side view the first embodiment of the leading edge assembly 9 shown in FIG. 2 which is connected to a fixed wing section 59 of the wing 3 shown in FIG. 1. More particularly, the housing 11 of the leading edge assembly 9 is mounted to a wing box 61 of the fixed wing section 59 of the wing 3 via two bolt connections 63.

Figure 5:
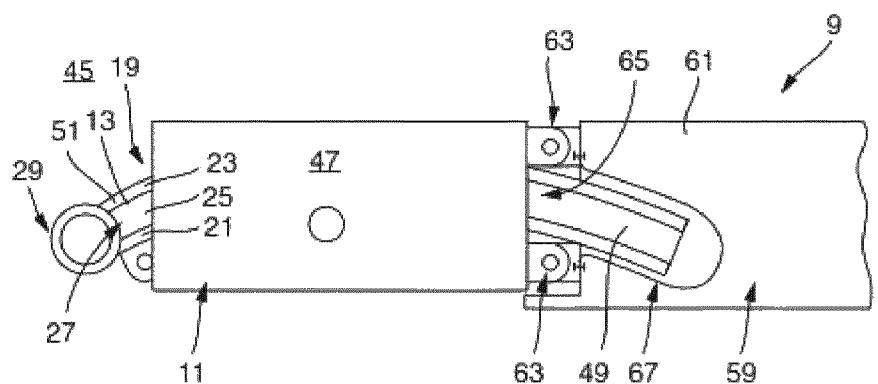
FIG. 5 schematically illustrates in a side view a second embodiment of the leading edge assembly of the wing shown in FIG. 1, wherein the leading edge assembly is connected to the fixed wing section of the wing shown in FIG. 1.
Figure 6:
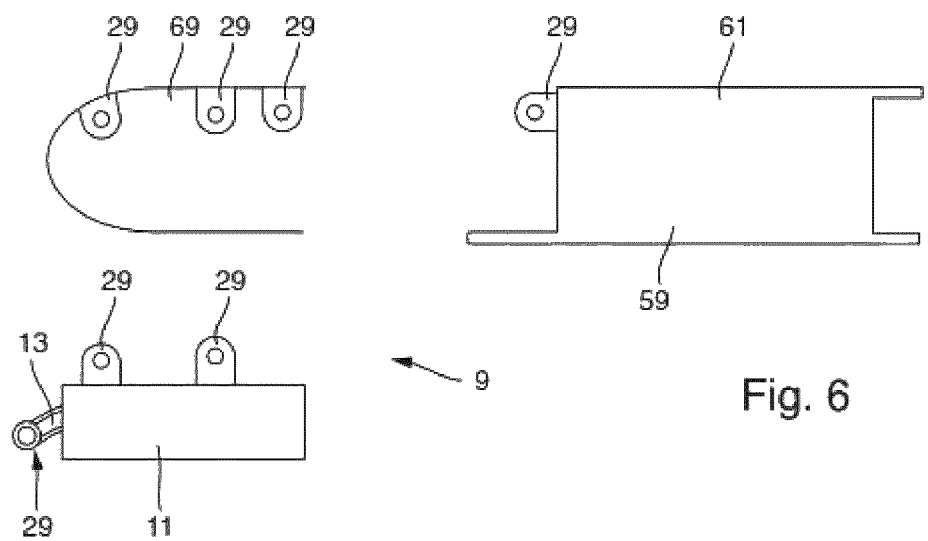
FIGS. 6 to 9 schematically illustrate in side views a third embodiment of the leading edge assembly of the wing shown in FIG. 1 and the steps how the leading edge assembly is connected to the fixed wing section of the wing shown in FIG. 1.

FIG. 5 schematically illustrates in a side view a second embodiment of the leading edge assembly 9 of the wing 3 shown in FIG. 1. The leading edge assembly 9 is connected to the fixed wing section 59 of the wing 3 shown in FIG. 1. A second opening 65 is formed in the housing 11. The second opening 65 connects the exterior 45 of the housing 11 with the interior 47 of the housing 11. The second opening is arranged opposite the first opening 19. The actuating element 13 extends through the second opening 65 when the actuating element 13 is in the first position shown in FIG. 5. The leading edge assembly 9 comprises a track can 67, which is arranged inside the wing box 61. Alternatively, the track can 67 can be a part of the wing box 61 such that when the leading edge assembly 9 is connected to the wing box 61, the actuating element 13 can extend into the track can 67.

Figure 7:
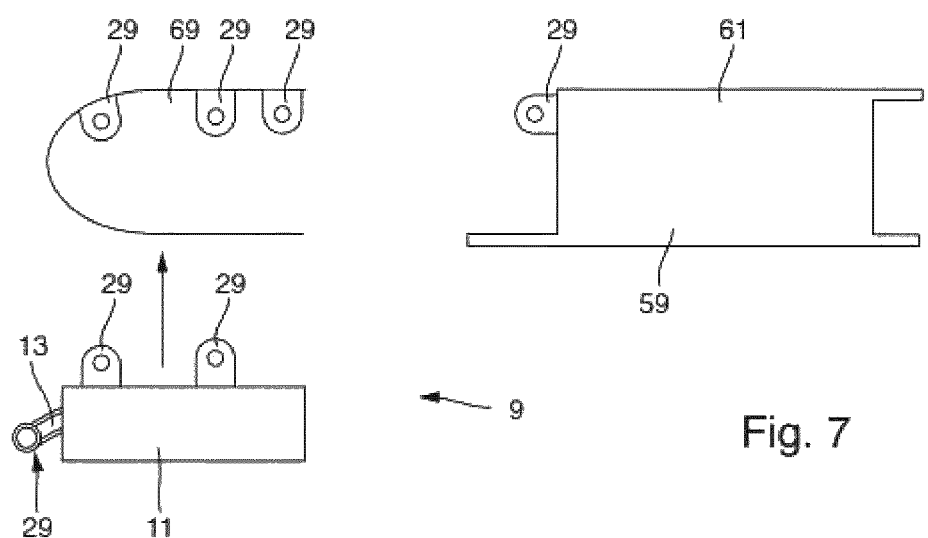
Figure 8:
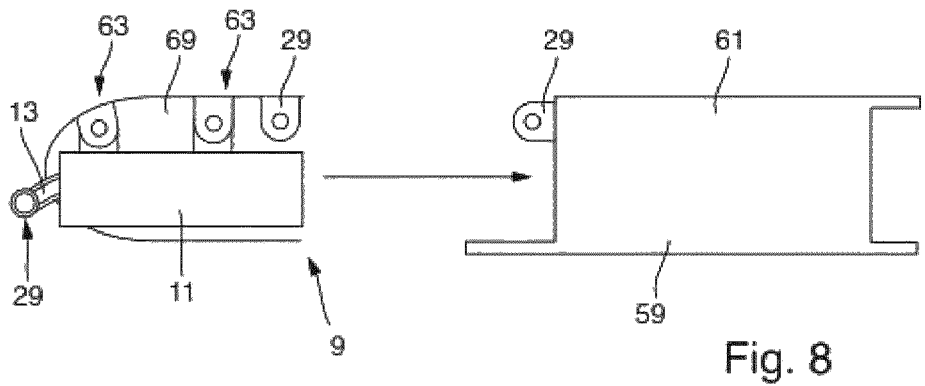
Figure 9:
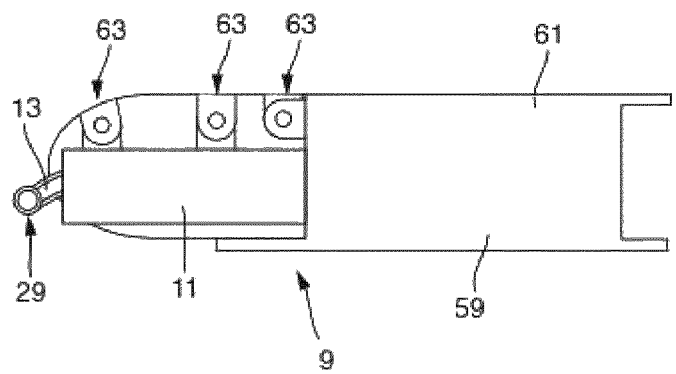

FIGS. 6 to 9 schematically illustrate in side views a third embodiment of the leading edge assembly 9 of the wing 3 shown in FIG. 1 and the steps how the leading edge assembly 9 is connected to the fixed wing section 59 of the wing 3 shown in FIG. 1. The leading edge assembly 9 comprises two lugs 29. Further, three lugs 29 are mounted to a rib 69 of the fixed wing section 59, and one lug 29 is mounted to the fixed wing section 59. First, the housing 11 is connected to the rib 69 as shown in FIG. 7 by two bolt connections 63 via two lugs 29, respectively, as shown in FIG. 8 to form a preassembled module. Then, the preassembled module is connected to the wing box 61 as shown in FIG. 8 by one bolt connection 63 via two lugs 29 as shown in FIG. 9. Therefore, the rib 69 is mounted to the wing box 61. In addition to the bolt connections 63, further connections can be provided between the housing 11 and the rib 69 and/or between the rib 69 and the wing box 61 and/or between the housing 11 and the wing box 61.

Figure 10:
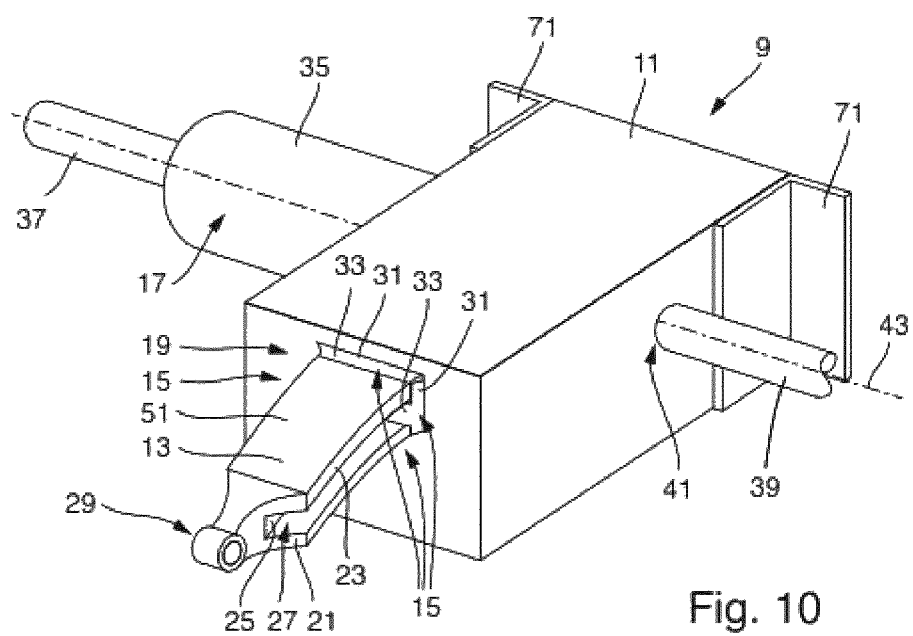
FIG. 10 schematically illustrates in a perspective view the first embodiment of the leading edge assembly of the wing shown in FIG. 1.

FIG. 10 schematically illustrates in a perspective view the first embodiment of the leading edge assembly 9 of the wing 3 shown in FIG. 1. Two brackets 71, which are L-shaped or L-angle brackets, are connected to the housing 11. The two brackets 71 may be preassembled to the housing 11 and then connected to the wing box 61. The brackets 71 may also be integrally formed with the housing 11 and each form a flange extending away from the housing 11.

Figure 11:
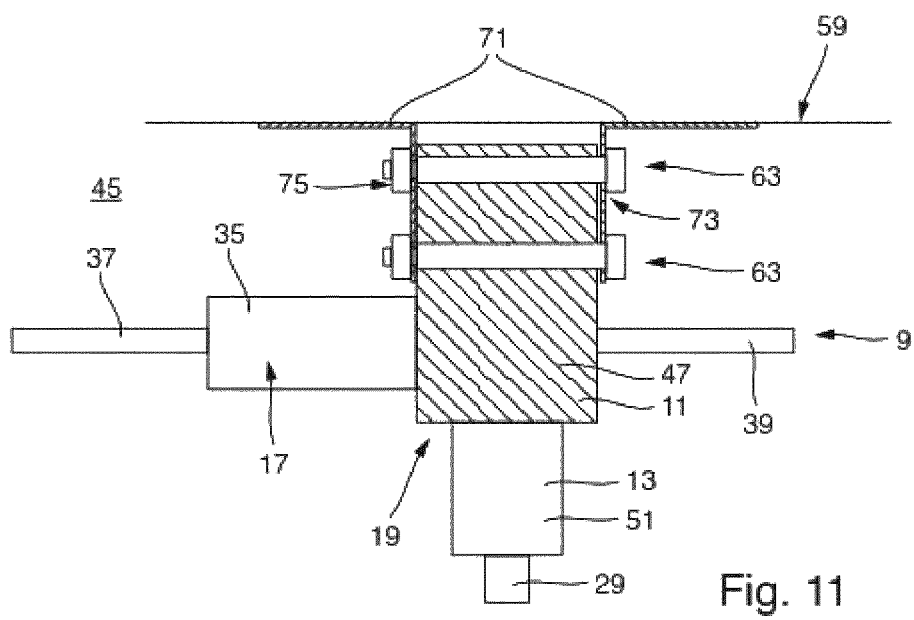
FIG. 11 schematically illustrates in a top view the first embodiment of the leading edge assembly of the wing shown in FIG. 1, wherein the leading edge assembly is connected to the fixed wing section of the wing shown in FIG. 1.

FIG. 11 schematically illustrates in a top view the first embodiment of the leading edge assembly 9 of the wing 3 shown in FIG. 1. The leading edge assembly 9 is connected to a front spar of a wing box 61 of the fixed wing section 59 of the wing 3 shown in FIG. 1. Each of the bolt connections 63 comprises a clamping side 73, also known as Master, and a spanwise play side 75, also known as Slave.

Figure 12:
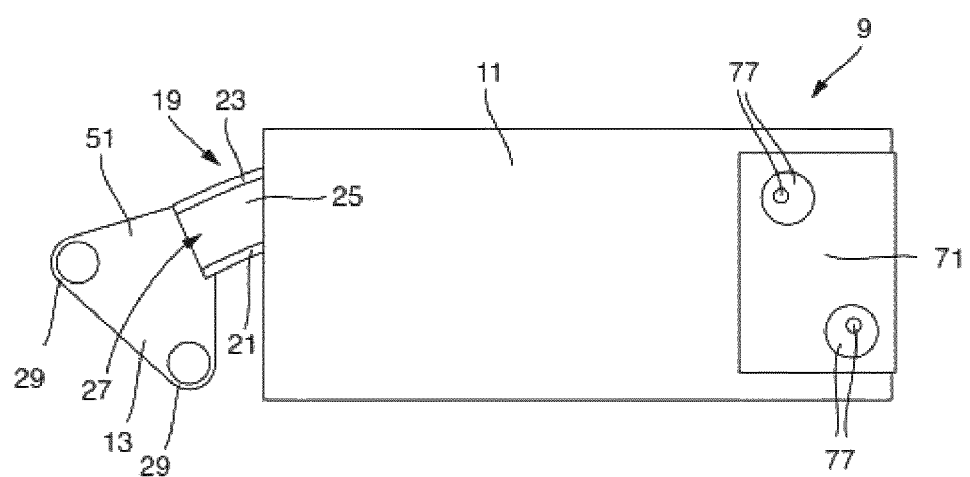
FIG. 12 schematically illustrates in a side view a fourth embodiment of the leading edge assembly of the wing shown in FIG. 1.

FIG. 12 schematically illustrates in a side view a fourth embodiment of the leading edge assembly 9 of the wing 3 shown in FIG. 1. The actuating element 13 comprises two lugs 29 for connecting a high lift device to the actuating element 13. Further, two bores 77 are formed in the bracket 71 and two bores 77 are formed in the housing 11 to enable the two bolt connections 63.

Figure 13:
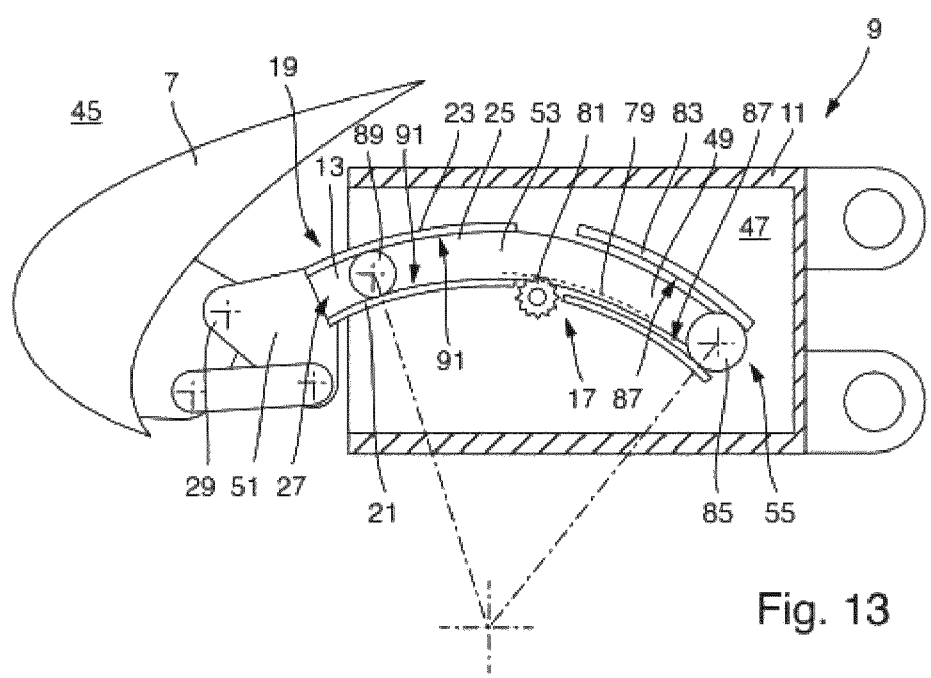
FIG. 13 schematically illustrates in a side view a fifth embodiment of the leading edge assembly of the wing shown in FIG. 1.

FIG. 13 schematically illustrates in a side view a fifth embodiment of the leading edge assembly 9 of the wing 3 shown in FIG. 1. The leading edge assembly 9 comprises the slat 7, which is an example of a high lift device. The slat 7 is mounted to the second section 51 of the actuating element 13. When the actuating element 13 is in the first position the high lift device is in a retracted position as shown in FIG. 13. When the actuating element 13 is in the at least one second position the high lift device is in the at least one extended position. The drive mechanism 17 comprises a rack 79 and a pinion 81. The rack 79 is mounted to the actuating element 13. The pinion 81 is rotatably mounted to the housing 11. The rack 79 and the pinion 81 meshingly engage with each other such that rotation of the pinion 81 drives movement of the rack 79.

The leading edge assembly 9 comprises the roller bearing 55. The first section 49 of the actuating element 13 and the middle section 53 of the actuating element 13 are mounted to the housing 11 via the roller bearing 55. The roller bearing 55 comprises a guide rail 83 mounted to the housing 11. Further, the roller bearing 55 comprises a first roller 85. The first roller 85 is rotatably mounted to the first section 49 of the actuating element 13. The first roller 85 engages a first engagement surface 87 formed by the guide rail 83 such that the first roller 85 rolls on the first engagement surface 87 when the actuating element 13 is moved between the first position and the at least one second position. The roller bearing 55 further comprises a second roller 89. The second roller 89 is rotatably mounted to the housing 11. The second roller 89 engages a second engagement surface 91 formed by the middle section 53 of the actuating element 13 and by the second section 51 of the actuating element 13 such that the second roller 89 rolls on the second engagement surface 91 when the actuating element 13 is moved between the first position and the at least one second position. The actuating element 13 comprises the lower flange section 21, the upper flange section 23, and the web section 25. The web section 25 connects the upper flange section 23 and the lower flange section 21. The second roller 89 is arranged in the recess 27 between the lower flange section 21 and the upper flange section 23. The lower flange section 21, the upper flange section 23, the web section 25, and the recess 27 each extend along a longitudinal axis of the actuating element 13. The actuating element 13 in FIG. 13 is curved. The longitudinal axis of the actuating element 13 is also curved and follows the shape of the actuating element 13. Particularly, the longitudinal axis of the actuating element 13 can extend from one side of the actuating element 13 to the other side of the actuating element 13 along a circular segment at the same distance from the two opposing second engagement surfaces 91. The second engagement surface 91 is formed by the upper flange section 23 and by the lower flange section 21.

It is additionally pointed out that "comprising" does not rule out other elements, and "a" or "an" does not rule out a multiplicity. It is also pointed out that features that have been described with reference to one of the above exemplary embodiments may also be disclosed as in combination with other features of other exemplary embodiments described above. Reference signs in the claims are not to be regarded as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A leading edge assembly for a wing, comprising:
a preassembled module connectable to a fixed wing section of the wing as a single unit, the preassembled module comprising:
a housing configured to be connectable to a fixed wing section of the wing with a first opening formed in the housing connecting an exterior of the housing with an interior of the housing and a second opening through a sidewall of the housing connecting the exterior of the housing with the interior of the housing,
an actuating element within the housing and movably connected to the housing such that the actuating element is movable between a first position and at least one second position,
wherein the actuating element extends through the first opening and comprises a first section arranged in the interior of the housing and a second section arranged at the exterior of the housing, the actuating element being configured to be connectable to a high lift device,
wherein the second opening is configured for accepting a drive mechanism therethrough for connection to the actuating element configured to drive movement of the actuating element,
wherein an annular seal is connected to the housing for abutting the drive mechanism,
wherein the leading edge assembly comprises a seal having a first seal section connected to the housing and a second seal section abutting the actuating element when the actuating element is moved between the first position and the at least one second position, such that the exterior of the housing and the interior of the housing are separated from each other by the seal,
wherein the leading edge assembly is arranged entirely in front of a front spar of the fixed wing section and does not penetrate the front spar of the fixed wing section,
wherein the leading edge assembly comprises a roller bearing, and
wherein the first section of the actuating element is mounted to the housing via the roller bearing,
wherein the roller bearing comprises a second roller rotatably mounted to the housing,
wherein the second roller engages a second engagement surface formed by the second section of the actuating element and by a middle section of the actuating element, such that the second roller rolls on the second engagement surface when the actuating element is moved between the first position and the at least one second position,
wherein the actuating element comprises a lower flange section, an upper flange section, and a web section connecting the upper flange section and the lower flange section,
wherein the second roller is arranged in a recess between the lower flange section and the upper flange section,
wherein the lower flange section, the upper flange section, the web section, and the recess each extend along a longitudinal axis of the actuating element,
wherein the second engagement surface is formed by at least one of the upper flange section or the lower flange section.

2. The leading edge assembly according to claim 1, wherein the leading edge assembly comprises the high lift device mounted to the second section of the actuating element, and
wherein when the actuating element is in the first position the high lift device is in a retracted position and when the actuating element is in the at least one second position the high lift device is in at least one extended position.

3. The leading edge assembly according to claim 2, wherein the high lift device is a slat.

4. The leading edge assembly according to claim 2, wherein the high lift device is a droop nose.

5. The leading edge assembly according to claim 2, wherein the high lift device is a Krueger flap.

6. The leading edge assembly according to claim 1, wherein the leading edge assembly comprises a drive mechanism configured to drive movement of the actuating element.

7. The leading edge assembly according to claim 6, wherein the drive mechanism comprises a rack and a pinion,
wherein the rack is mounted to the actuating element and the pinion is rotatably mounted to the housing, and wherein the rack and the pinion meshingly engage with each other such that rotation of the pinion drives movement of the rack.

8. The leading edge assembly according to claim 1,
wherein the roller bearing comprises a guide rail mounted to the housing and a first roller rotatably mounted to the first section of the actuating element,
wherein the first roller engages a first engagement surface formed by the guide rail such that the first roller rolls on the first engagement surface when the actuating element is moved between the first position and the at least one second position.

9. A wing for an aircraft comprising a leading edge assembly according to claim 1, wherein the housing of the leading edge assembly is mounted to the fixed wing section of the wing.

10. The wing according to claim 9, wherein the housing of the leading edge assembly is mounted to a wing box of the fixed wing section of the wing.

11. The wing according to claim 10, wherein the housing of the leading edge assembly is mounted to a rib of the fixed wing section, wherein the rib is mounted to the wing box.

12. An aircraft comprising a wing according to claim 9.

* * * * *